(12) United States Patent
Lambert

(10) Patent No.: X6945
(45) Date of Patent: Feb. 27, 1832

(54) RIFLES, CANE

(76) Inventor: Roger N. Lambert

United States Patent Patent No.: X6945

Roger N. Lambert Upton Massachusetts.

Letters Patent.

The Schedule referred to in these Letters Patent and making part of the same containing a description in the words of the said Roger Newton Lambert himself of his improvement in rifles and Guns called Lamberts cane Rifle.

To All to whom these Presents shall come.

Be it known, that I Roger Newton Lambert, of Upton, in the County of Worcester, and Common Wealth of Massachusetts Physician, have invented a new and useful improvement in Guns and Rifles called Lamberts Cane Rifles and that the following is a full and exact description of the construction and opperation of the said improvement, as invented and improved by me, to wit)

Lamberts Cane Rifle, consists of a Barrel either grooved or smooth, with a Lock inserted into a stock made to resemble a walking cane. The head of the cane is bored to receive a cylindrical metal plate about three inches in length, of even diameter through =out, which may be called the slide plate. This is firmly fixed in the head of the cane with rivets or screws. on each side of the plate, a slit, or groove, is cut, to receive the end of the pivot pin or screw passing throug the end of the Lock; which slide into this plate; so that, when the head of the cane is pressed downwards upon the cane stick, the lock slides up into the head and is entirely covered and concealed by it. When the head is pulled off from the cane, outward, the lock is drawn out in the slides so as to be uncovered and exposed to view. on each side of the lock, a part of the side plate projects about half an inch, and the slits on or grooves are so far extended as to permit the head to be bent downwards a quarter of a circle, turning on the ends of the pivot pin or screw.—

To the upper end, or breech, of the barrel is screwed a pin of iron, projecting upward, as does the breech-pin of the common Gun.— this pin is hollow, and contains a chamber for powder, continued through the screw by which it is inserted, and opening into the barrel con=structed like the chamber of a pocket pistol.—

On the upper side, is fixed the little cone of metal, with a priming hole into the chamber for receiving a percussion cap.— To the sides of the chamber, are screwed the side plates of the lock, of metal, about two inches long, flat on the inside surfaces, rounded on the exterior and of such thickness as to afford sufficient strength and firmness to support the cock and spring, and to make the lock correspond with the diameter of the barrel to which it is attached.

Between these side plates is a strong spring inser=ted in or screwed to the sides, at the end nearest the barrel and having the other end acting on the foot of the cock. On the upper surface of the lock, over the chamber and main spring, lies the cock, confined between the side plates by the pivot pin or screw before mentioned.

This pivot pin passes through the side plates, and cock, at the end next the head, and its ends slide in the grooves or slits of the slide plate.— The cock, is a bent lever of steel, turning and moving on the pivot pin.— One end of its long arm nearly touches the barrel, having a little cavity to fit over the priming cone upon the chamber; the other end turns on the end of the lock next the head, on the pivot pin.— The short arm laying on the underside of the lock, beneath the pivot pin, forms a foot, on which the main main spring rests and acts, either directly or by a stirrup pressing the end of the long arm down on the priming cane, a small dog of steel having a notch or tooth on its surface, on which the edge of the slide plate in the head, catches, when the head of the cane is bent downwards, is let into the lower outer edge of the foot of the cock and moves with it.

This dog, rests on a spring, also let into the foot of the cock which keeps it out so far beyond the surface of the lock, as to catch the edge of the slide plate when the head is bent down. — The trigger lays in the plate which covers the lower side of the lock. When the cock is down, the trigger is level with the surface. — When the cock is elevated, it is started out and rests against the dog let into the foot of the cock. being pulled, it depresses the dog, and disengages the cock from the edge of the slide plate. The cock is then thrown down by the action of the mainspring on the priming cane.

To the end of the barrel at the muzzle an inner ferule of metal is closely fitted. — The barrel slides within the stick, or cane, about half an inch. — A spiral spring is wound round it, one end of which rests on and acts against the inner ferule at the muzzle; and the other rests on and acts against the end of the cane or stick, keeping the barrel out as far as it is permitted to slide. — Over this, is an exterior ferule, fastened with screws or rivets to the cane, cover-ing the spiral spring and resembling in appearance the ferule of a common walking cane.

When the barrel is pulled so as to slide into the cane, the extremity or cap of the ferule, which is hung by a strap of metal in the side of the ferule with a hinge or pivot at their extremity, falls off by its own weight. — The spiral spring causes the barrel to start out, thus preventing the cap from being replaced until the barrel is again drawn in. a small screw or pin, on this ferule, answers the purpose of a sight for aiming... A slit or mortise is made in the long arm of the cock, and when elevated, serves as a guide at the other extremity of the barrel. An inner ferrule, is fastened to that end of the cane next the lock, with screws inserted into slides in the barrel, which prevent its being turned round in screwing off the chamber, as well as its sliding too far out by the action of the spiral spring before mentioned. Over this is an outer ferule, or ring, with a pin passing through a little mortise; which when turned catches into a notch in the slide plate and bolts the head firmly to the cane, so that it cannot be drawn off until disengaged by turning back the ring.

The cane rifle, is loaded by screwing off the chamber in the same manner in which the pocket pistol is charged. - The percussion cap having been placed on the priming case, the chamber is filled with powder and the ball or shot placed over it.

When the Gun is to be fired, the head is drawn out bringing back the barrel until the cap of the ferrule is thrown off from the muzzle. - by bending the head downward, the lower edge of the slide plate, catches the dog let into the foot of the cock which elevates the long arm of the cock.... The head thus bent serves for a breach by which the gun is conveniently held and aimed by looking through the slit in the cock over the sight in the ferule on the muzzle.... The trigger being pressed against the dog, pushes it down, the cock thus disengaged falls smartly on the end of the priming cane and the piece is discharged The head after the Cane Rifle is fired remains bent until replaced - affording a convenient means of holding and managing the instrument.

The instrument may be varied in size or materials at the pleasure of the Manufacturer and for the the purpose of adapting it to the different uses of which it is susceptible.

The instrument, when closed, so entirely resembles a common walking cane, and the barrel and apparatus are so perfectly connected in the stick, that it would require very careful exami=nation by those not acquainted with its construction, to discover the uses for which it is designed, as an efficient weapon of offence or defence, and for the purposes of the marksman and hunter.

Your petitioner particularly claims as his own invention in the Rifle-cane above specified, and described.

1st The sliding of the barrel in the cane so as to remove the cap over the muzzle.

2nd The movement and apparatus by which the cap is thrown off and replaced, in its application to the cane Rifle --- 3rd The motion of the head, at the same time elevating the cock and furnishing a breech to hold and manage the instrument, and a guide to aim the Rifle.

In Testimony that the above is a true Specification of my said improvement as above described, I have hereunto set my hand and seal the second day of February in the year of our Lord eighteen hundred and thirty two.

Witnesses

William Lincoln

Willm. S. Lincoln

Roger Newton [illegible]

Exd

[illegible]

1650 [illegible]

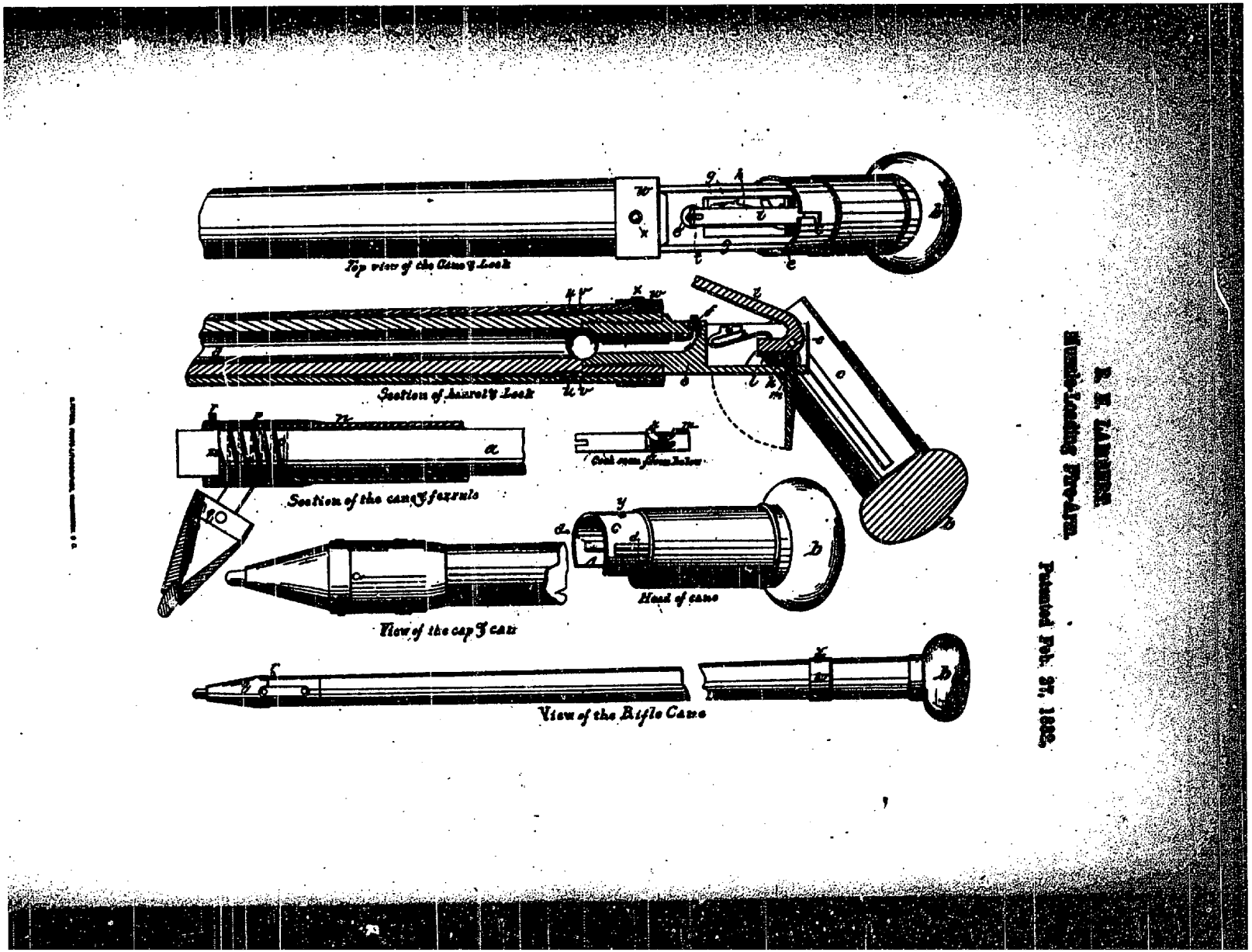

United States Patent
Patent No.: X6945